(12) United States Patent
Gupta et al.

(10) Patent No.: US 11,663,129 B2
(45) Date of Patent: *May 30, 2023

(54) USING A MACHINE LEARNING MODULE TO DYNAMICALLY DETERMINE TRACKS TO PRESTAGE FROM STORAGE TO CACHE

(71) Applicant: International Business Machines Corporation, Armonk, NY (US)

(72) Inventors: Lokesh M. Gupta, Tucson, AZ (US); Kyler A. Anderson, Sahuarita, AZ (US); Matthew G. Borlick, Tucson, AZ (US); Kevin J. Ash, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 168 days.

This patent is subject to a terminal disclaimer.

(21) Appl. No.: 17/144,135

(22) Filed: Jan. 7, 2021

(65) Prior Publication Data

US 2021/0133108 A1    May 6, 2021

Related U.S. Application Data

(63) Continuation of application No. 16/147,265, filed on Sep. 28, 2018, now Pat. No. 10,963,386, which is a
(Continued)

(51) Int. Cl.
*G06F 12/0862* (2016.01)
*G06N 20/00* (2019.01)

(52) U.S. Cl.
CPC ........ *G06F 12/0862* (2013.01); *G06N 20/00* (2019.01); *G06F 2212/462* (2013.01); *G06F 2212/602* (2013.01)

(58) Field of Classification Search
None
See application file for complete search history.

(56) References Cited

U.S. PATENT DOCUMENTS 9,128,854 B1 * 9/2015 Derbeko ............. G06F 12/0862
9,298,633 B1    3/2016 Zhao et al.
(Continued)

OTHER PUBLICATIONS

Response to Office Action, dated Jan. 8, 2021, for U.S. Appl. No. 16/012,779, filed Jun. 20, 2018, (18.799), Total 17 pages.
(Continued)

*Primary Examiner* — Rocio Del Mar Perez-Velez
*Assistant Examiner* — Marwan Ayash
(74) *Attorney, Agent, or Firm* — Konrad Raynes Davda & Victor LLP; David W. Victor

(57) ABSTRACT

Provided are a computer program product, system, and method for determining tracks to prestage into cache from a storage. Information is provided related to determining tracks to prestage from the storage to the cache in a stage group of sequential tracks including a trigger track comprising a track number in the stage group at which to start prestaging tracks and Input/Output (I/O) activity information to a machine learning module. A new trigger track in the stage group at which to start prestaging tracks is received from the machine learning module having processed the provided information. The trigger track is set to the new trigger track. Tracks are prestaged in response to processing an access request to the trigger track in the stage group.

20 Claims, 7 Drawing Sheets

Related U.S. Application Data continuation of application No. 16/012,779, filed on Jun. 20, 2018.

(56) References Cited

U.S. PATENT DOCUMENTS

| | | | |
|---|---|---|---|
| 9,769,030 | B1 | 9/2017 | Ramalingam et al. |
| 9,817,765 | B2 * | 11/2017 | Gill .................... G06F 12/0862 |
| 10,963,386 | B2 | 3/2021 | Gupta et al. |
| 2004/0255026 | A1 | 12/2004 | Blount et al. |
| 2012/0198148 | A1 | 8/2012 | Benhase et al. |
| 2013/0238861 | A1 | 9/2013 | Manne et al. |
| 2017/0230476 | A1 | 8/2017 | Dow et al. |
| 2017/0322885 | A1 | 11/2017 | Mukherjee et al. |
| 2019/0391919 | A1 | 12/2019 | Gupta et al. |
| 2019/0391920 | A1 | 12/2019 | Gupta et al. |

OTHER PUBLICATIONS

Final Office Action2, dated Jun. 9, 2021, for U.S. Appl. No. 16/012,779, filed Jun. 20, 2018, (18.799), Total 16 pages.

List of Patents and Applications Treated as Related, Dated Jan. 7, 2021, Total 2 pages.

US Patent Application, dated Jun. 20, 2018, for U.S. Appl. No. 16/012,779 (18.799), filed Jun. 20, 2018, Total 39 pages.

Preliminary Amendment, dated Jun. 18, 2020, for U.S. Appl. No. 16/012,779, filed Jun. 20, 2018, (18.799), Total 11 pages.

Office Action, dated Mar. 3, 2020, for U.S. Appl. No. 16/012,779, filed Jun. 20, 2018, (18.799), Total 17 pages.

Response to Office Action, dated May 29, 2020, for U.S. Appl. No. 16/012,779, filed Jun. 20, 2018, (18.799), Total pp. 16.

Final Office Action, dated Jul. 20, 2020, for U.S. Appl. No. 16/012,779, filed Jun. 20, 2018, (18.799), Total 19 pages.

Response to Final Office Action, dated Sep. 21, 2020, for U.S. Appl. No. 16/012,779, filed Jun. 20, 2018, (18.799), Total 17 pages.

Office Action, dated Oct. 8, 2020, for U.S. Appl. No. 16/012,779, filed Jun. 20, 2018, (18.799), Total 13 pages.

US Patent Application, dated Sep. 28, 18, for U.S. Appl. No. 16/147,265 (18.799C1), filed Sep. 28, 2018, invented by Lokesh M. Gupta et al., Total 39 pages.

Preliminary Amendment, dated Sep. 28, 2018, for U.S. Appl. No. 16/147,265 (18.799C1), filed Sep. 28, 2018, invented by Lokesh M. Gupta et al., Total 11 pages.

Office Action, dated Mar. 12, 2020, for U.S. Appl. No. 16/147,265, (18.799C1) filed Sep. 28, 2018, invented by Lokesh M. Gupta et al., Total 18 pages.

Response to Office Action, dated May 29, 2020, for U.S. Appl. No. 16/147,265, (18.799C1) filed Sep. 28, 2018, invented by Lokesh M. Gupta et al., Total 13 pages.

Final Office Action1, dated Jul. 20, 2020, or U.S. Appl. No. 16/147,265, (18.799C1) filed Sep. 28, 2018, invented by Lokesh M. Gupta et al., Total 15 pages.

Response to Final Office Action, dated Sep. 21, 2020, for U.S. Appl. No. 16/147,265, (18.799C1) filed Sep. 28, 2018, invented by Lokesh M. Gupta et al., Total 15 pages.

Notice of Allowance, dated Nov. 20, 2020, dated Oct. 20, 2020, for U.S. Appl. No. 16/147,265, (18.799C1) filed Sep. 28, 2018, invented by Lokesh M. Gupta et al., Total 15 pages.

* cited by examiner

Prestage Information

I/O Activity Information

USING A MACHINE LEARNING MODULE TO DYNAMICALLY DETERMINE TRACKS TO PRESTAGE FROM STORAGE TO CACHE

BACKGROUND OF THE INVENTION

1. Field of the Invention

The present invention relates to a computer program product, system, and method for using a machine learning module to dynamically determine tracks to prestage from storage to cache.

2. Description of the Related Art

In a storage system, a storage controller may prestage tracks from the storage into cache to make available for a sequential process that is accessing tracks in sequence. In this way, the sequential process may be immediately provided the requested tracks from cache without having to wait for the tracks to be staged into the cache from a further away storage or memory device having a slower access profile than the cache device. A prestage process is defined by a trigger track indicating a track number, or track offset, in a stage group of sequential tracks at which prestaging starts and a prestage amount of a number of sequential tracks from the trigger track to prestage. In this way, when the sequential access process accesses the trigger track, the prestage amount of sequential tracks from the trigger track are prestaged.

In an adaptive prestaging algorithm, the trigger track and prestage amount may be adjusted to increase the likelihood of cache hits, i.e., a requested track was previously prestaged into the cache at the time of the request to the track. An adaptive prestaging algorithm may increase the prestage amount if the last track of a stage group is read, up to the maximum number of tracks in a stage group. If there is a cache miss, i.e., a requested track is not in the cache, then the trigger track may be reduced to start prestaging earlier in the stage group. If a track was prestaged and is about to be demoted before being accessed, such as at the Least Recently Used (LRU) end of a cache LRU list, then that track may be added to a Most Recently Used (MRU) end of the cache LRU list. If the track in cache is about to be demoted after already having been moved to the MRU end after the previous demotion, then the track is demoted. When the track is accessed, the prestage amount may be decreased and trigger track may be increased, to prestage fewer tracks. If the prestage trigger track is less than a prestage amount by a predetermined minimum distance, then the trigger track number is reduced to prestage further away from the prestage amount.

There is a need in the art for improved techniques to determine when to prestage tracks and how many tracks to prestage.

SUMMARY

An embodiment may comprise a computer program product, system, and method for determining tracks to prestage into cache from a storage. Information is provided related to determining tracks to prestage from the storage to the cache in a stage group of sequential tracks including a trigger track comprising a track number in the stage group at which to start prestaging tracks and Input/Output (I/o) activity information to a machine learning module. A new trigger track in the stage group at which to start prestaging tracks is received from the machine learning module having processed the provided information. The trigger track is set to the new trigger track. Tracks are prestaged in response to processing an access request to the trigger track in the stage group.

The described embodiment provide improvements to computer technology for determining tracks to prestage by using a machine learning module that is trained to produce a trigger track and prestage amount values that optimize computer performance parameters such as bandwidth, cache hits, and response time based on current operational parameters. The machine learning module trained for such optimization may then be used to determine the optimal trigger track and prestage amount based on current operational parameters. This allows for continual and dynamic adjustment of the trigger track and prestage amount as operational parameters change, such as load on computational resources in the form of allocated destage and stage tasks, used bandwidth in device adaptors, average time of a track in cache, etc.

In a further embodiment, a prestage amount indicating a number of tracks to prestage upon processing the trigger track in the stage group is received from the machine learning module having processed the provided information. The prestaging tracks in response to the processing the trigger track comprises prestaging the prestage amount of tracks from the storage to the cache.

With the above further embodiment, the machine learning module further provides a prestage amount to optimize selection of both prestage parameters, the trigger track and prestage amount.

In a further embodiment, the information related to determining tracks to prestage provided to the machine learning module comprises a plurality of: an I/O speed of a storage device on which prestaged tracks reside; the trigger track; the prestage amount; a current adaptor bandwidth through which data is transferred between the cache and the storage device; and a number of destage and stage tasks allocated to destage tracks from the cache to the storage and stage tracks from the storage to the cache.

With the above further embodiment, the machine learning module may consider performance parameters such as adaptor bandwidth and number of destage and stage tasks allocated for destage and stage operations, respectively. This allows the machine learning module to be trained to optimize the selection of the trigger track and prestage amount on various performance parameters so as to select the trigger track and prestage amount to result in improved performance parameters.

In a further embodiment, the storage unit comprises a Redundant Array of Independent Disk (RAID) rank of a plurality of RAID ranks, wherein each of the RAID ranks is comprised of storage devices.

In a further embodiment, a request to access a track in the cache is processed. The information related to determining tracks to prestage is provided to the machine learning module in response to processing the request to access the track.

With the above embodiment, the determining the optimized prestage parameters, such as the trigger track and prestage amount is performed when processing a request to access a track to adjust the trigger track and prestage amount to optimize for current operating conditions at a time the track is accessed.

In a further embodiment, a determination is made as to whether the accessed tack comprises the new trigger track from the machine learning module. The prestaging of tracks is performed in response to the accessed track comprising the new trigger track.

With the above embodiment, the determined optimal trigger track is utilized immediately for a just accessed track to allow the prestaging if the just accessed track happens to be the newly determined optimal trigger track. This allows for immediate implementation of the optimal trigger track determined by the machine learning module for the current access to a track.

In an additional embodiment of a computer program product, system, and method for determining tracks to prestage into cache from a storage, a machine learning module receives as input information related to determining tracks to prestage, from the storage to the cache, in a stage group of sequential tracks including a trigger track comprising a track number in the stage group at which to start prestaging tracks and Input/Output (I/O) activity information. The machine learning module outputs at least one of a new trigger track and a new prestage amount of tracks to prestage when processing the trigger track.

At least one of a current trigger track and a current prestage amount are adjusted based on information related to an accessed track in the cache to produce at least one of an adjusted current trigger track and an adjusted current prestage amount. The machine learning module is retrained with the information related to determining tracks to prestage to produce at least one of the adjusted current trigger track and the adjusted current prestage amount. The retrained machine learning module is used to produce at least one of the new trigger track and the new prestage amount to use to determine tracks to prestage.

With the above embodiment, the machine learning module is retrained based on an adjusted trigger track and prestage amount that are adjusted based on information related to an accessed track. The machine learning module is retrained to produce the adjusted trigger track and prestage amount based on current operational conditions.

In a further embodiment, the information related to the accessed track comprises a time margin of error based on a difference of a current time and a time when the accessed track was prestaged. The adjusting the at least one of the current trigger track and the current prestage amount comprises adjusting the at least one of the current trigger track and the current prestage amount by the time margin of error.

With the above further embodiment, the trigger track and prestage amount are adjusted based on a time margin of error indicating a length of time a track was in the cache to provide an adjustment based on whether the prestaged track was in track for too long or too short of a period of time, which can result in prestaged tracks being demoted before being accessed or too few tracks being prestaged which results in cache misses.

In a further embodiment, the accessed track comprises a demoted track selected for demotion from the cache to the storage.

With the above embodiment, the prestage amount and trigger track are adjusted for retraining the machine learning module based on information related to a demoted track to retrain and optimize the machine learning module based on information on the current track being demoted.

In a further embodiment, a determination is made as to whether the demoted track was accessed while in the cache. The adjusting the at least one of the current trigger track and the current prestage amount comprises performing at least one of decreasing the current trigger track and increasing the current prestage amount by a percentage based on the time margin of error in response to determining that the demoted track was accessed while in the cache and performing at least one of increasing the current trigger track and decreasing the current prestage amount by a percentage based on the time margin of error in response to determining that the demoted track was not accessed while in the cache.

With the above embodiment, when the demoted track was accessed while in the cache, the prestage parameters may be modified to allow more tracks to be prestaged, such as by decreasing the trigger track to trigger prestaging earlier in the stage group and increase the number of tracks prestaged by the time margin based on how long the track was in cache. However, if the demoted track was not accessed while in cache, then prestaged tracks need to remain longer in cache to be available for a future access, which can be implemented by increasing the current trigger track to cause prestaging later in the stage group and decreasing the prestage amount to prestage fewer tracks.

In a further embodiment, the information related to the accessed track comprises a track position margin of error based on a difference of the current trigger track and a number of the accessed track in the stage group. The adjusting the at least one of the current trigger track and the current prestage amount comprises decreasing the current trigger track by the track position margin of error to prestage tracks earlier in the stage group.

With the above embodiment, a distance of the accessed track from the trigger track, or track position margin of error, is used to determine how to adjust the trigger track and prestage amount, so that the current trigger track can be decreased by the track position margin of error to cause more prestaging earlier in the stage group.

In a further embodiment, the accessed track comprises a track subject to an I/O request as part of a sequential access that is not in the cache.

DETAILED DESCRIPTION

Current adaptive prestaging algorithms do not take into account a device speed of the storage device staging tracks and the effect of prestaging on bandwidth availability in the device adaptor between the cache and the storage, and the effect of bandwidth on operations.

Described embodiments provide improvements to the computer technology for prestaging tracks from a storage device into cache by using a machine learning module that is trained to produce a trigger track and prestage amount values that optimize computer performance parameters such as bandwidth, cache hits, and response time based on current operational parameters. The machine learning module trained for such optimization may then be used to determine the optimal trigger track and prestage amount based on current operational parameters. This allows for continual and dynamic adjustment of the trigger track and prestage amount as operational parameters change, such as load on computational resources in the form of allocated destage and stage tasks, used bandwidth in device adaptors, average time of a track in cache, etc. In this way, the prestage trigger track and prestage amount are continually adjusted to optimize operational parameters such as cache hits, adaptor bandwidth, response time, etc. for the current operational parameters in the system.

Figure 1:
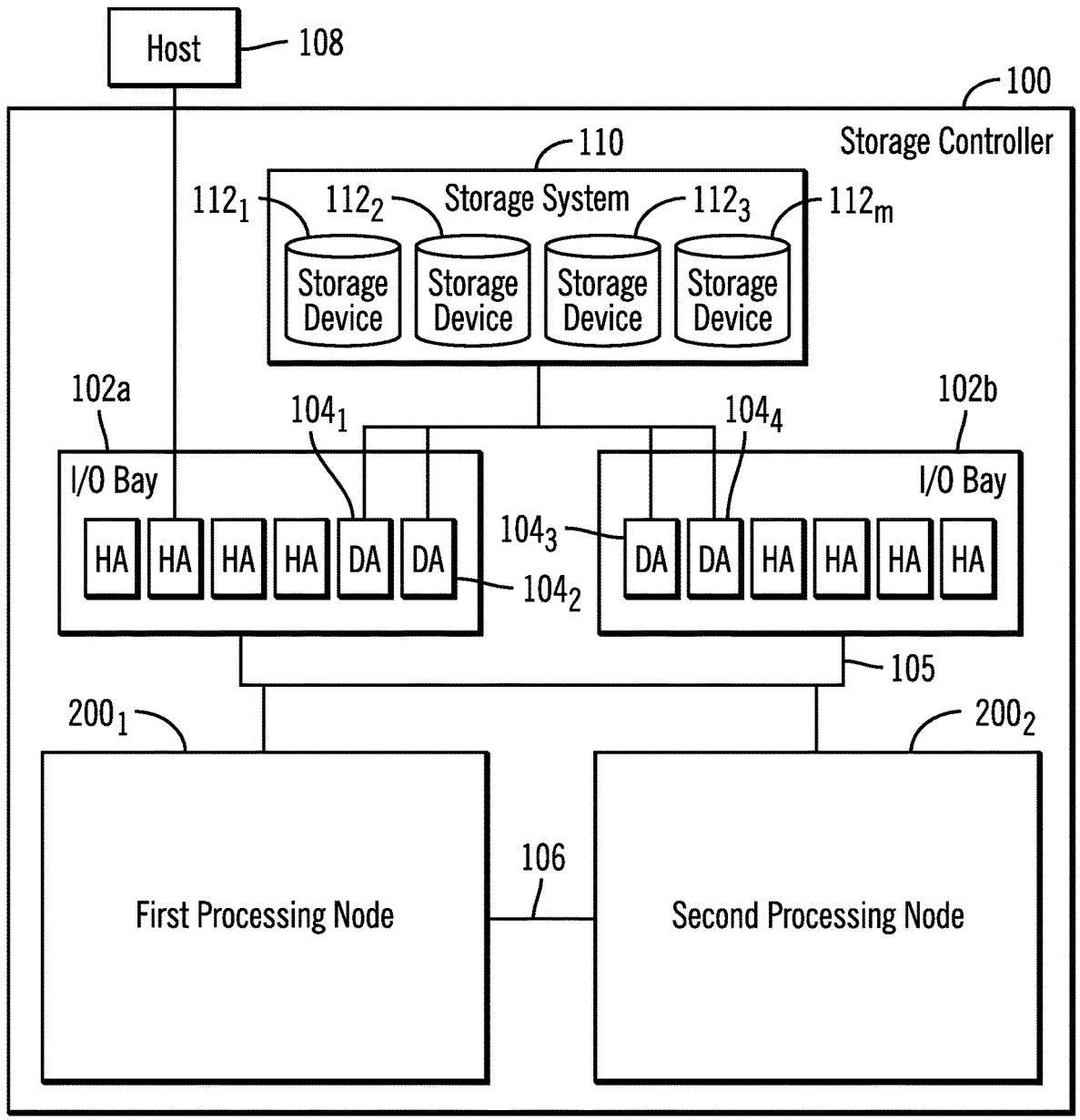
FIG. 1 illustrates an embodiment of a computing environment.

FIG. 1 illustrates an embodiment of a storage controller 100 including a plurality of independent processing nodes $200_1$, $200_2$, such as a central electronics complex (CEC), that each connect to Input/Output (I/O) bays 102a, 102b having device adaptors (DA) $104_1$, $104_2$, $104_3$, $104_4$, also referred to as storage adaptors, and host adaptors (HA) therein, over a bus interface 105, such as a Peripheral Component Interconnect Express (PCIe) bus. The processing nodes $200_1$, $200_2$ may also communicate with each other directly over a link 106, such as a PCIe bus. Host systems, such as host 108, may connect to the storage controller 100 through a host adaptor (HA) in the I/O bays 102a, 102b.

A storage system 110 includes a plurality of storage devices $112_1$ ... $112_m$, in which tracks, logical volumes, ranks of logical contiguous storage spaces, and storage arrays, such as Redundant Arrays of Independent Disks (RAID), may be configured. Each processing node $200_1$, $200_2$ may be assigned one of the device adaptors in each of the I/O bays 104a, 104b that connect to the storage array 110 to provide access to data configured in the storage devices 112. Each processing node $200_1$, $200_2$ has a default configuration to communicate with a device adaptor (DA) $104_1$, $104_2$, $104_3$, $104_4$ in one of the I/O bays 102a, 102b, where the default configuration will assign the different processing nodes $200_1$, $200_2$ to device adaptors in the I/O bays 102a, 102b.

In the embodiment of FIG. 1, two redundant processing nodes $200_1$, $200_2$ and two I/O bays 102a, 102b are shown. In further embodiments, there may be more than the number of shown redundant elements $200_1$, $200_2$, 102a, 102b, to provide additional redundancy. Alternatively, there may be only one processing node in the system.

The storage controller 100 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world).

The storage devices $112_1$ ... $112_m$ in the storage system 110 may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Storage arrays may further be configured ranks in the storage devices $112_1$ ... $112_m$, such as Just a Bunch of Disks (JBOD), Direct Access Storage Device (DASD), Redundant Array of Independent Disks (RAID) array, virtualization device, etc. Further, the storage devices $112_1$ ... $112_m$ in the storage 110 may comprise heterogeneous storage devices from different vendors and different types of storage devices, such as a first type of storage devices, e.g., hard disk drives, that have a slower data transfer rate than a second type of storage devices, e.g., SSDs.

Figure 2:
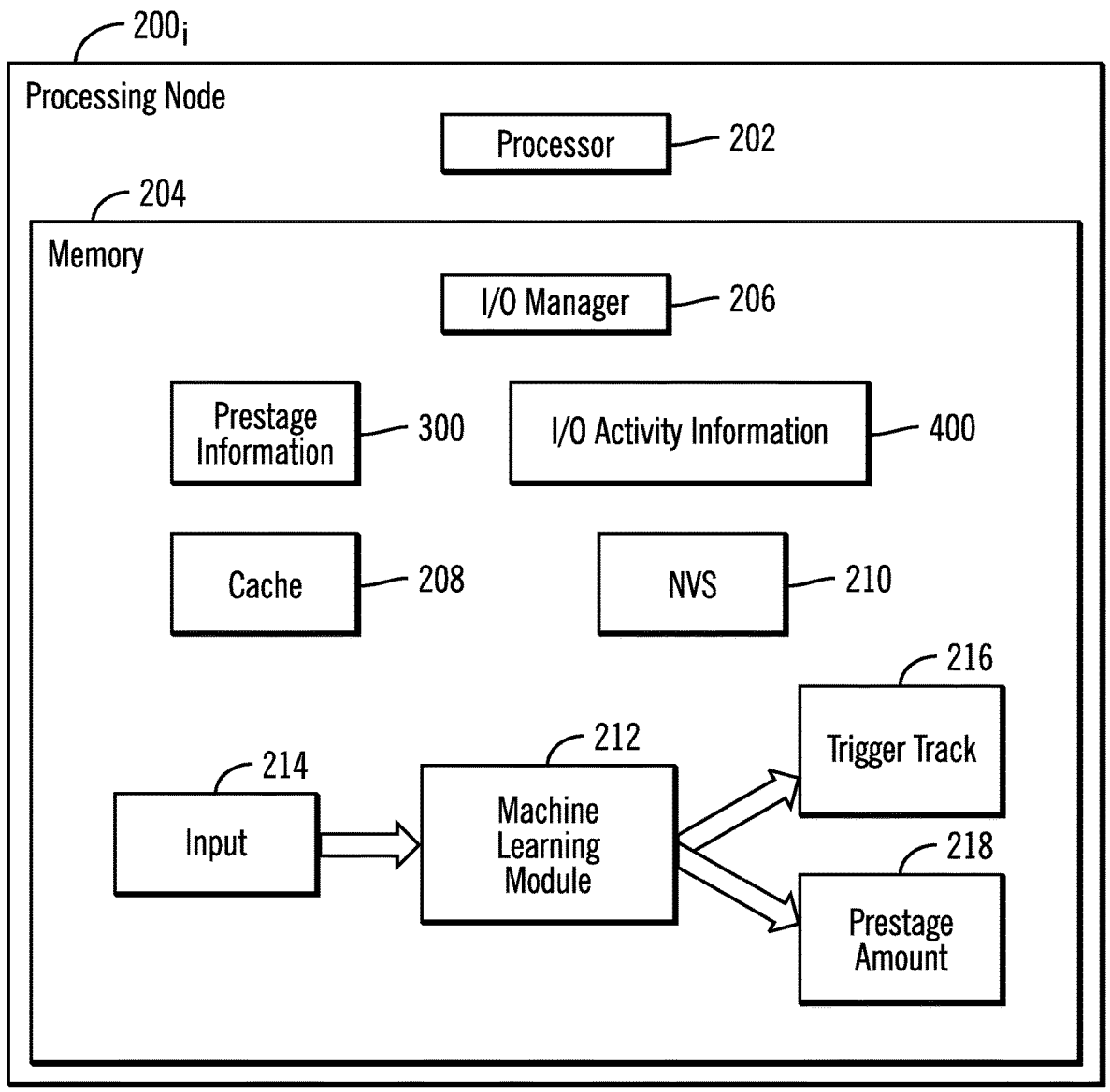
FIG. 2 illustrates an embodiment of a processing node.

FIG. 2 illustrates an embodiment of a processing node $200_i$, such as one of the processing nodes $200_1$, $200_2$, including a processor 202, such as one or more processor devices, and a memory 204 having program code executed by the processor 202. The memory 204 includes an I/O manager 206 to manage I/O requests from attached hosts 108 to storage arrays configured in the storage devices $112_1$ ... $112_m$, and perform other related operations, such as path selection and error handling. The memory 204 further includes a cache 208 to cache tracks from the storage devices $112_1$ ... $112_m$ and a non-volatile storage ("NVS") 210 to provide a backup storage of modified tracks in the cache 208 in another processing node $200_j$. Each processing node $200_1$, $200_2$ may be assigned groups of the storage arrays configured in the storage devices $112_1$ ... $112_m$.

The memory 204 includes prestage information 300 used to determine when to start prestaging tracks in a stage group of tracks and a prestage amount of a number of tracks to prestage. For instance, tracks may be operated upon and read as part of a stage group of consecutive tracks and the trigger track indicates a track number in the stage group that when processed causes the prestaged amount of tracks to be prestaged. The memory 204 further includes I/O activity information 400 having information on I/O access.

In embodiments where the host 108 operating system comprises Z Systems Operating System (Z/OS®), or other similar operating system, an I/O request may define the stage group of tracks subject to operations, such as sequential access operations, by providing a locate record domain that specifies the subset of tracks subject to the I/O operations, and the trigger track would be the track at the track number in the locate record domain matching the trigger track number.

The memory 204 includes a machine learning module 212 that receives as input 214 prestage information 300 and I/O activity information 400 and computes a trigger track 216 and prestage amount 218. The machine learning module 212 implements a machine learning technique such as decision tree learning, association rule learning, artificial neural network, inductive programming logic, support vector machines, Bayesian models, etc. The I/O manager 206 may then use the outputted trigger track 216 and prestage amount 218 to determine when in a stage group of sequential tracks to prestage and a prestage amount 218 of tracks to prestage from the trigger track 216. The arrows shown from the input 214 to the machine learning modules 212 and to the outputs 216, 218 illustrate a flow of data to and from the machine learning module 212 and not actual structures in the memory 204.

In one embodiment, the machine learning modules 212 may comprise artificial neural network programs. Each neural network may be trained using backward propagation to adjust weights and biases at nodes in a hidden layer to produce the computed trigger track and prestage amount. The machine learning module 212 is trained to produce a trigger track 216 and prestage amount 218 to optimize and balance computational goals, such as minimize cache misses and optimize other parameters, such as response time and bandwidth in the device adaptors $104_1$, $104_2$, $104_3$, $104_4$ transferring data between the cache 208 and the storage 110.

In backward propagation used to train a neural network machine learning module, margin of errors are determined based on operational parameters, such as a time a demoted track has been in cache and a position of an accessed track resulting in a cache miss in a stage group with respect to the trigger track, and biases at nodes in the hidden layer are adjusted accordingly to decrease the margins of error in these measured storage parameters. Backward propagation may comprise an algorithm for supervised learning of artificial neural networks using gradient descent. Given an artificial neural network and an error function, the method may calculate the gradient of the error function with respect to the neural network's weights and biases.

Although FIG. 2 shows one machine learning module 212, there may be separate machine learning module 212 for each RAID rank, or other storage unit, configured in the storage 110 or one machine learning module for all the ranks, or one or more storage units configured in the storage 110.

The I/O manager 206 and machine learning module 212 are shown in FIG. 2 as program code loaded into the memory 204 and executed by the processor 202. Alternatively, some or all of the functions may be implemented in hardware devices in the processing nodes $200_1$, $200_2$, such as in Application Specific Integrated Circuits (ASICs) or executed by separate dedicated processors.

The memory 204 and cache 208 may comprise one or more memory devices, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and a Non-Volatile Direct In-Line Memory Modules (DIMMs) with byte-addressable write-in-place memory, etc. The non-volatile storage ("NVS") 210 may comprise a non-volatile storage, such as NAND storage, e.g., flash memory, Solid State Drive (SSD) storage, non-volatile RAM, etc. Other non-volatile devices may be used for the non-volatile storage 210, such as a battery backed-up DIMM.

Figure 3:
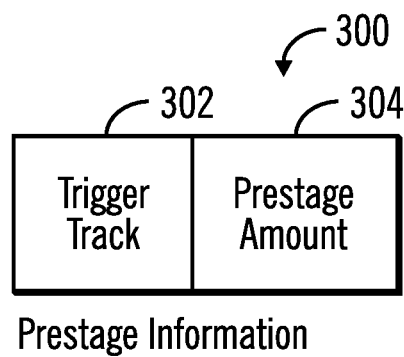
FIG. 3 illustrates an embodiment of prestage information.

FIG. 3 illustrates an embodiment of prestage information 300 including a trigger track 302 indicating a track number offset in a stage group of sequential tracks being processed, such as a locate record domain or other group, at which the I/O manager 206 starts prestaging tracks and a prestage amount 304 of a number of tracks to prestage from the trigger track 302. The parameters 302 and 304 may be set when outputted from the machine learning module 212 as values 216 and 218.

Figure 4:
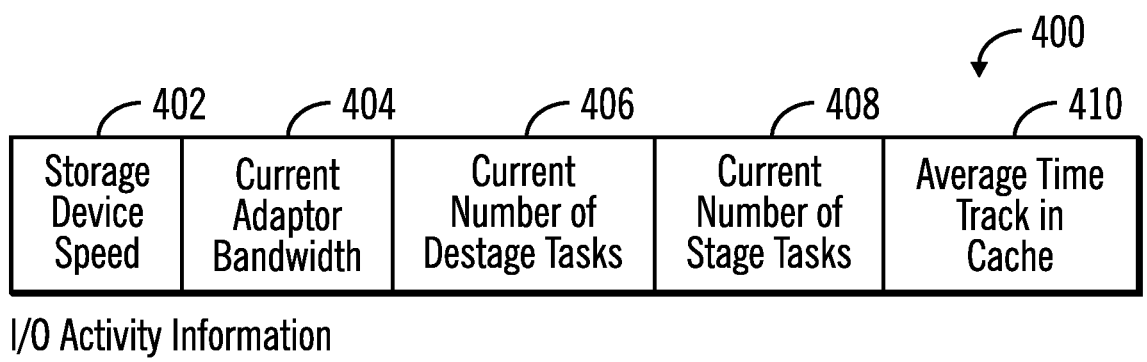
FIG. 4 illustrates an embodiment of Input/Output (I/O) activity information.

FIG. 4 illustrates an embodiment of I/O activity information 400 gathered by the I/O manager 206 to use as input 214 to the machine learning module 212 and includes a storage device speed 402 of the storage devices $112_1, 112_2 \ldots 112_m$ storing the tracks in the stage group based on a measured operational speed or a speed determined by the manufacturer and indicated in device specifications; a current adaptor bandwidth 404 indicating current used and/or available bandwidth in the device adaptors $104_1, 104_2, 104_3, 104_4$; a current number of destage tasks 406 allocated to destage tracks from the cache 208 to the storage 110; a current number of stage tasks 408 allocated to stage tracks from the storage 110 to the cache 208; and an average time a track is in the cache 410. In a RAID embodiment, there may be a separate instance of prestage information 300 and I/O activity information 400 for each RAID rank.

Figure 5:
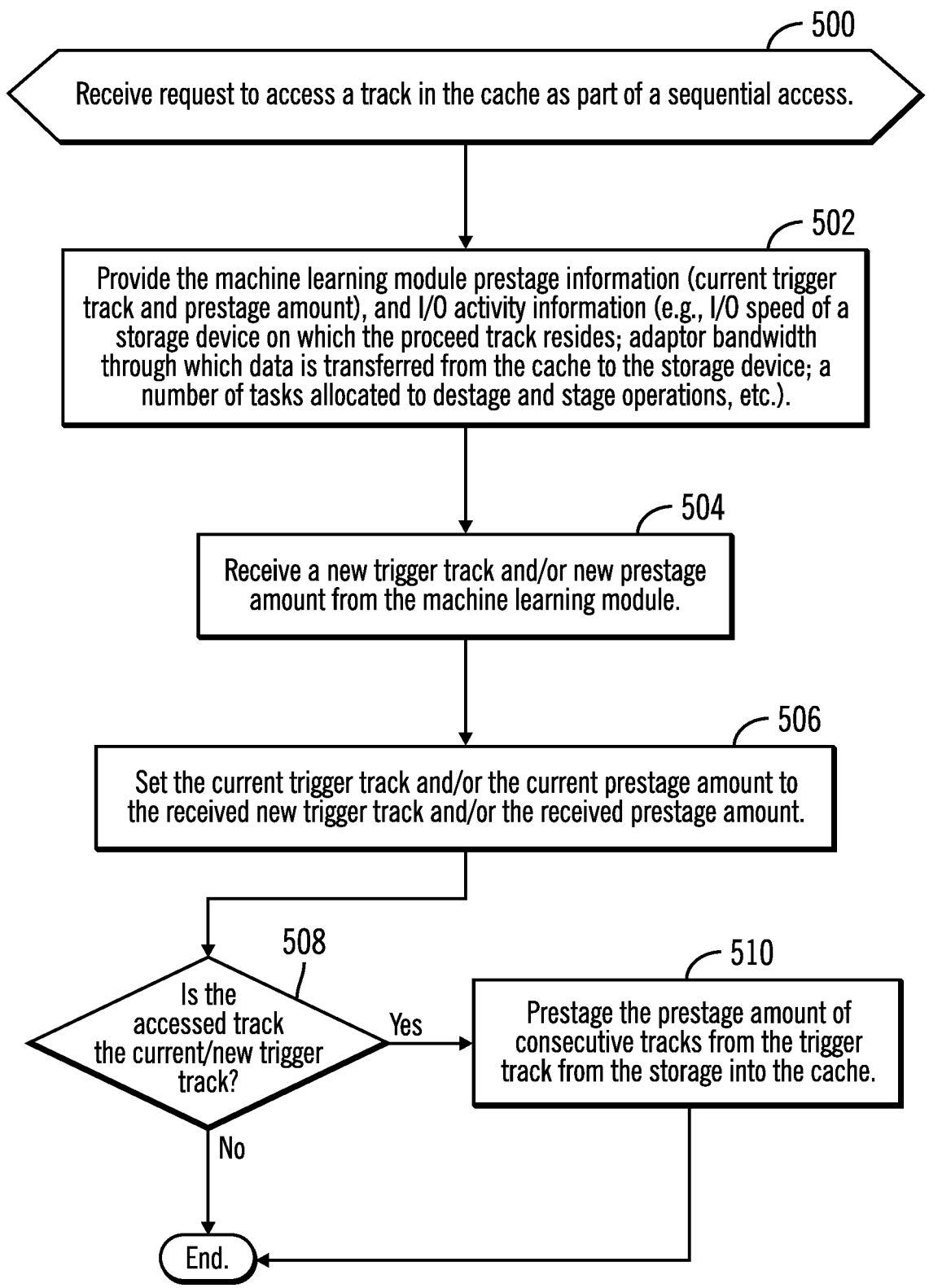
FIG. 5 illustrates an embodiment of operations to use a machine learning module to determine a trigger track and/or prestage amount for prestaging of tracks.

FIG. 5 illustrates an embodiment of operations performed by the I/O manager 206 to process a request to read a track as part of a sequential access to a stage group of tracks. The operations of FIG. 5 may also be performed after a predetermined number of track accesses to adjust the trigger track and prestage amount after a number of accesses. Upon receiving (at block 500) a sequential access request, the I/O manager 206 provides (at block 502) the machine learning module 212 as input 214 prestage information 300, (current trigger track 302 and prestage amount 304) and I/O activity information 400 (e.g., I/O speed of a storage device 402 on which the proceed track resides; adaptor bandwidth 404 through which data is transferred from the cache 208 to the storage device 112, a number of destage tasks 406 allocated to process a destage queue to destage tracks from the cache 208 to the storage 110; and a number of stage tasks 408 allocated to process a stage queue to stage tracks from the storage 110 to the cache 208). Other information concerning operational and computer performance parameters that could be affected by increasing or decreasing the number of tracks prestaged into cache 208 may also be considered.

In response to the input 214, the I/O manager 206 receives (at block 504) from the machine learning module 212 a new trigger track 216 and/or new prestage amount 218 and sets (at block 506) the current trigger track 302 and current prestage amount 304 to the received values 216 and 218. If (at block 508) the accessed track comprises the current/new trigger track 216, such as the accessed track number comprising the trigger track 216 number, then the I/O manager 206 prestages (at block 510) the prestage amount 218 of the consecutive tracks from the trigger track 216 or current accessed track from the storage 110 into the cache 208. Otherwise, if the accessed track does not yet comprise the trigger track 216, control ends.

With the embodiment of FIG. 5, the trigger track 302 and/or prestage amount 304 are continually updated after track accesses to optimize performance parameters to improve computer operations, such as improve bandwidth, response time, stage and destage operations, etc. This allows continual modification of the prestage parameters of trigger track and prestage amount to optimize computer performance.

Figure 6:
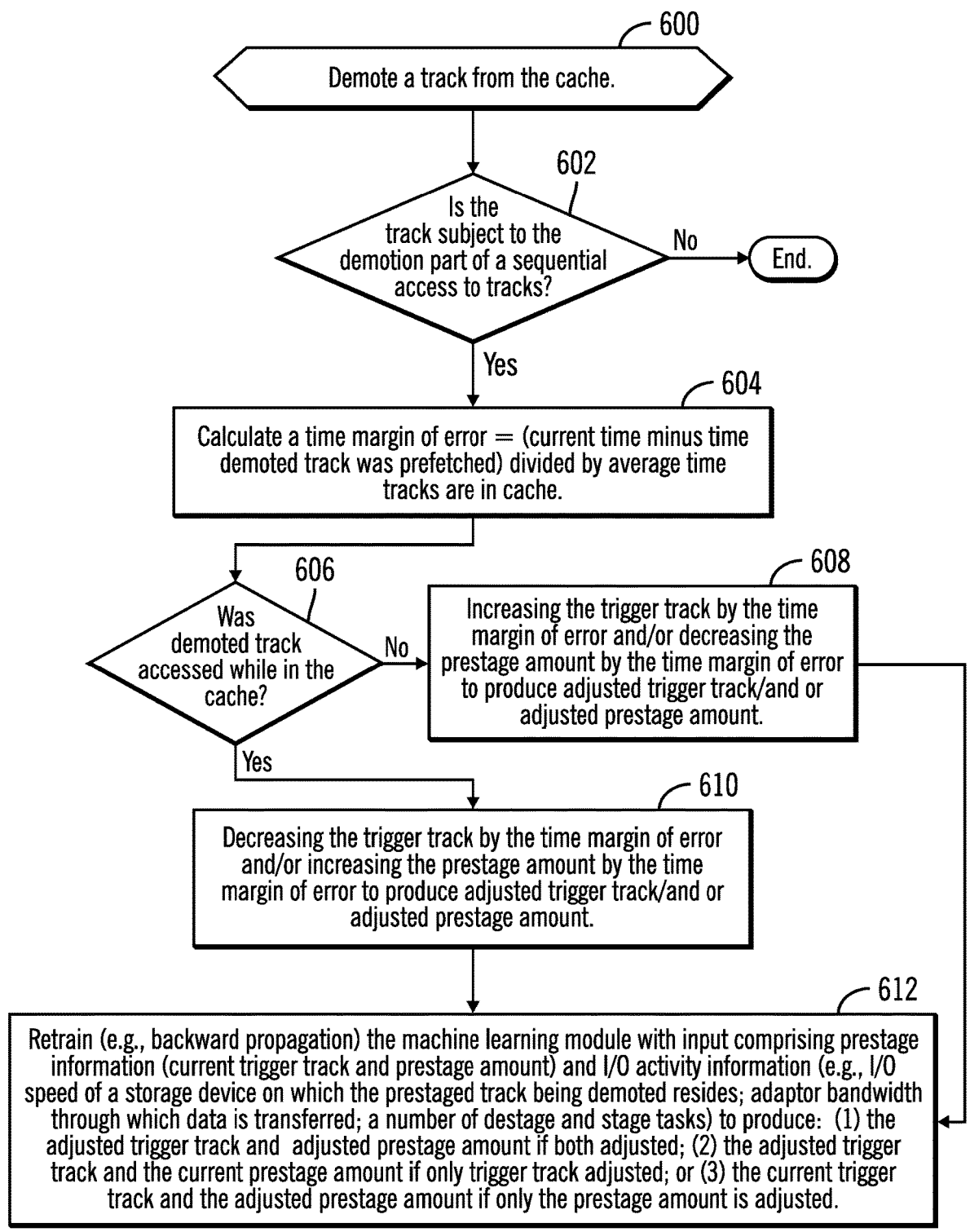
FIG. 6 illustrates an embodiment of operations to retrain the machine learning module when demoting a track from the cache.

FIG. 6 illustrates an embodiment of operations performed by the I/O manager 206 and/or machine learning module 212 to retrain the machine learning module 212 to improve how it calculates the trigger track 216 and prestage amount 218 to optimize computer performance when demoting a track from the cache. The operations of FIG. 6 may be performed when demoting each track from the cache 208 or after demoting a predetermined number of tracks from the cache 208. Upon demoting (at block 600) a track from the cache 208, the I/O manager 206 determines (at block 602) whether the track is subject to a sequential access to multiple tracks. If not, control ends. If (at block 602) the track is subject to sequential access, then the I/O manager 206 determines (at block 604) a time margin of error based on a time the demoted track was in cache, and may be calculated as (current time–time demoted track was prefetched) divided by an average time tracks are in the cache 410. The average time tracks are in cache 410 may be updated whenever a track is demoted from the cache 208. If (at block 606) the demoted track was not accessed while in the cache 208, then the current trigger track 302 is increased (at block 608) by the time margin of error and/or the prestage amount 304 is decreased by the time margin of error to produce an adjusted trigger track/and or adjusted prestage amount. If the demoted track was not accessed, then this means that too many tracks are being prefetched to overfill the cache to cause prefetched tracks to be demoted before the prefetched tracks are accessed. In this way, the operation at block 608 causes fewer tracks to be prefetched by increasing the trigger track 302 to cause prefetching later in the stage group of tracks and/or by decreasing the prestage amount 304 to cause fewer tracks to be prestaged when the trigger track is processed. Thus, by prestaging fewer tracks, prestaged tracks will remain in cache 208 longer, i.e., not forced out by too many prestages, to be available to be accessed when the sequential process accesses that prefetched track.

If (at block 606) the demoted track was accessed in the cache 208, then the current trigger track 302 is decreased (at block 610) by the time margin of error and/or the prestage amount 304 is increased by the time margin of error to produce an adjusted trigger track/and or adjusted prestage amount. If the demoted track was accessed before being demoted, then this means that the cache 208 may be able to accommodate more tracks being prefetched. In this way, the operation at block 610 causes more tracks to be prefetched by decreasing the trigger track 302 to cause prefetching earlier in the stage group of tracks and/or by increasing the prestage amount 304 to cause more tracks to be prestaged when the trigger track is processed. Thus, by prestaging more tracks, a sequentially accessed track will more likely be in cache 208 when requested because more tracks are being prestaged.

In an embodiment of blocks 608 and 610, the increasing or decreasing by the time margin of error may comprise multiplying the trigger track and prestage amount by one plus the margin of error to increase or multiplying by one minus the margin of error to decrease. In alternative embodiments, the time margin of error may be used in other functions to increase or decrease the trigger track and destage amount. In alternative embodiments, the time margin of error may be calculated in additional ways using the current time and a time the demoted track was prefetched into the cache 208.

After adjusting the trigger track 302 and/or the prestage amount 304, the machine learning module 212 is retrained (e.g., backward propagation) (at block 612) with input 214 comprising current operational parameters of prestage information 300 (current trigger track 302 and prestage amount 304) and I/O activity information 400 (e.g., I/O speed of a storage device 402 on which the demoted track resides; adaptor bandwidth 404 through which data is transferred between the cache 208 and the storage device $112_i$; a number of allocated destage tasks 406 and stage tasks 408 to a storage unit (storage device or RAID rank)) to produce the adjusted trigger track and adjusted prestage amount if both are adjusted, or produce the adjusted trigger track and the current prestage amount if only the trigger track is adjusted, or produce the current trigger track and the adjusted prestage amount if only the prestage amount is adjusted. In this way, the machine learning module 212 is retrained to produce the determined optimized trigger track and/or prestage amount based on current operating conditions reflected by the prestage information 300 and I/O activity information 400 provided as input 214 to the machine learning module 212.

With the embodiment of FIG. 6, the machine learning module 212 is retrained to produce an adjusted trigger track and/or adjusted prestaged amount that was adjusted to keep the prefetched tracks in cache 208 longer or shorter to ensure that prestaged tracks are available in cache 208 when requested to improve the cache hit ratio in the computer system.

Figure 7:
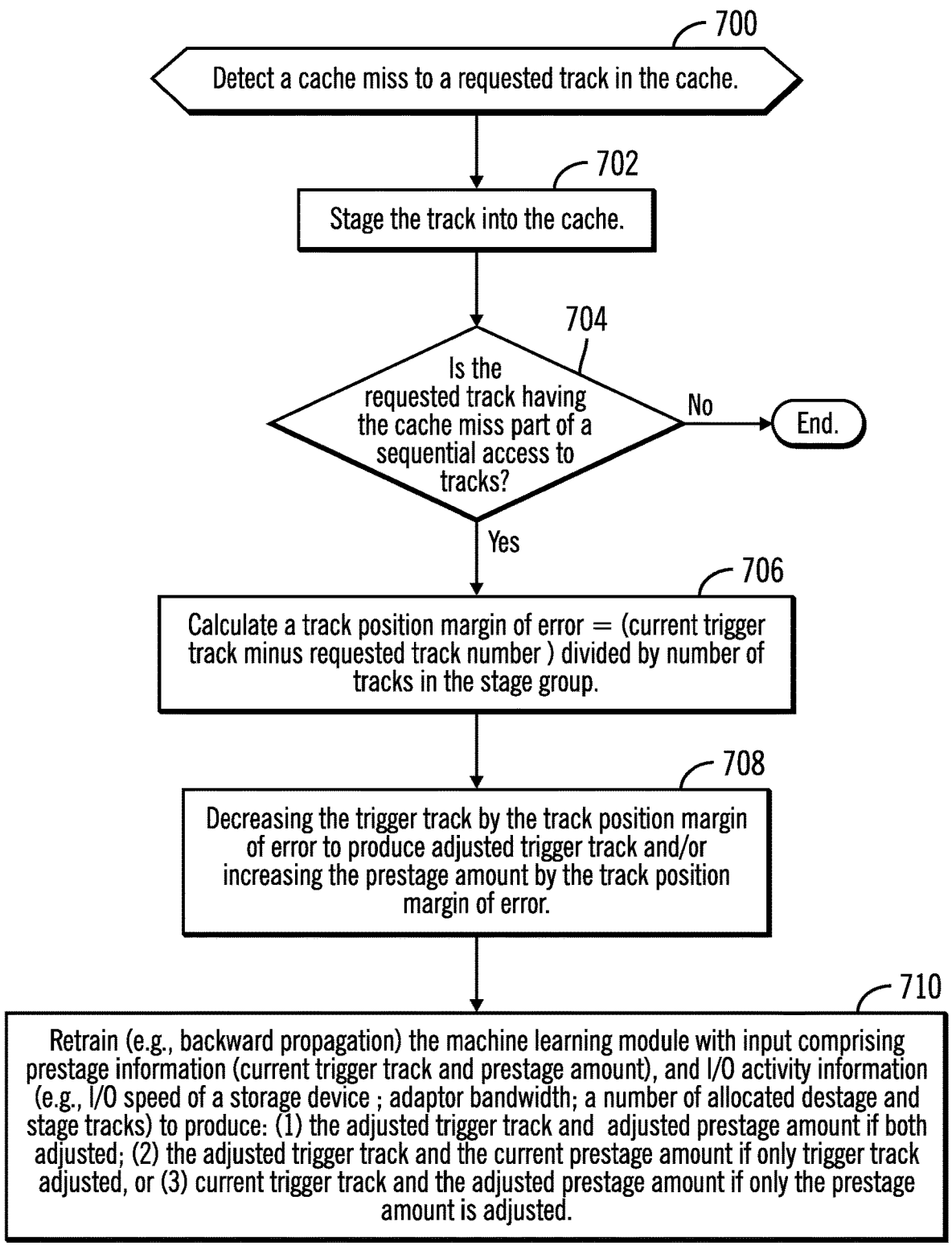
FIG. 7 illustrates an embodiment of operations to retrain the machine learning module when detecting a cache miss for a requested track.

FIG. 7 illustrates an embodiment of operations performed by the I/O manager 206 and/or machine learning module 212 to retrain the machine learning module 212 to improve the calculation of the trigger track 216 and prestage amount 218 to optimize computer performance in response to detecting a cache miss, a request for a track that is not in the cache 208 and needs to be staged from the storage 110 into the cache 208. The operations of FIG. 7 may be performed upon each cache miss or after a predetermined number of cache misses occur. Upon detecting (at block 700) a cache miss, the I/O manager 206 initiates a stage (at block 702) of the track into cache 208. If (at block 704) the track is not subject to a sequential access to multiple tracks, then control ends. Otherwise, if (at block 704) the track is subject to sequential access, then the I/O manager 206 calculates (at block 706) a track position margin of error comprising a (current trigger track minus the requested track number) divided by the number of tracks in the group of consecutive tracks. This calculated track position margin of error indicates how far the requested track was from the trigger track in the track group when the cache miss occurred, i.e., how far the requested track was away from being prestaged into the cache 208 where it would have been available to avoid the cache miss.

The I/O manager 206 decreases the trigger track 302 by the track position margin of error to produce an adjusted trigger track and/or increases the prestage amount by the track position margin of error. This adjustment causes tracks to be prefetched sooner and/or more tracks to be prefetched to avoid future occurrences of cache misses. In an embodiment of block 708, the decreasing the trigger track may comprise multiplying the trigger track by one minus the track position margin of error and the increasing the prestage amount may comprise multiplying the prestage amount by one plus the track position margin of error. In alternative embodiments, the track position margin of error may be used in other functions to decrease the trigger track and increase the destage amount. In alternative embodiments, the track position margin of error may be calculated in additional ways using the current trigger track and the requested track number in the stage group.

After adjusting the trigger track 302 and/or the prestage amount 304, the machine learning module 212 is retrained (e.g., backward propagation) (at block 710) with input 214 comprising prestage information 300 (current trigger track 302 and prestage amount 304) and I/O activity information 400 (e.g., I/O speed of a storage device 402 on which the requested track resides; adaptor bandwidth through which data is transferred between the cache 208 and the storage device $112_i$; a number of allocated destage tasks 406 and stage tasks 508 to a storage unit (storage device or RAID rank)) to produce the adjusted trigger track and adjusted prestage amount if both are adjusted, or produce the adjusted trigger track and the current prestage amount if only the trigger track is adjusted, or produce the current trigger track and the adjusted prestage amount if only the prestage amount is adjusted.

With the embodiment of FIG. 7, the machine learning module 212 is retrained to produce the determined optimized trigger track and/or prestage amount based on current operating conditions reflected by the prestage information 300 and I/O activity information 400 provided as input 214 to the machine learning module 212 in order to avoid cache misses.

The described embodiments provide a dynamic technique for determining the trigger track and prestage amounts to use to determine when and how many tracks to prestage for future access requests to the tracks and a dynamic technique to determine when to retrain a machine learning module used to calculate the trigger track and prestage amount to use that optimizes on one or more storage performance parameters.

In the described embodiment, variables i, j, m, n, etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
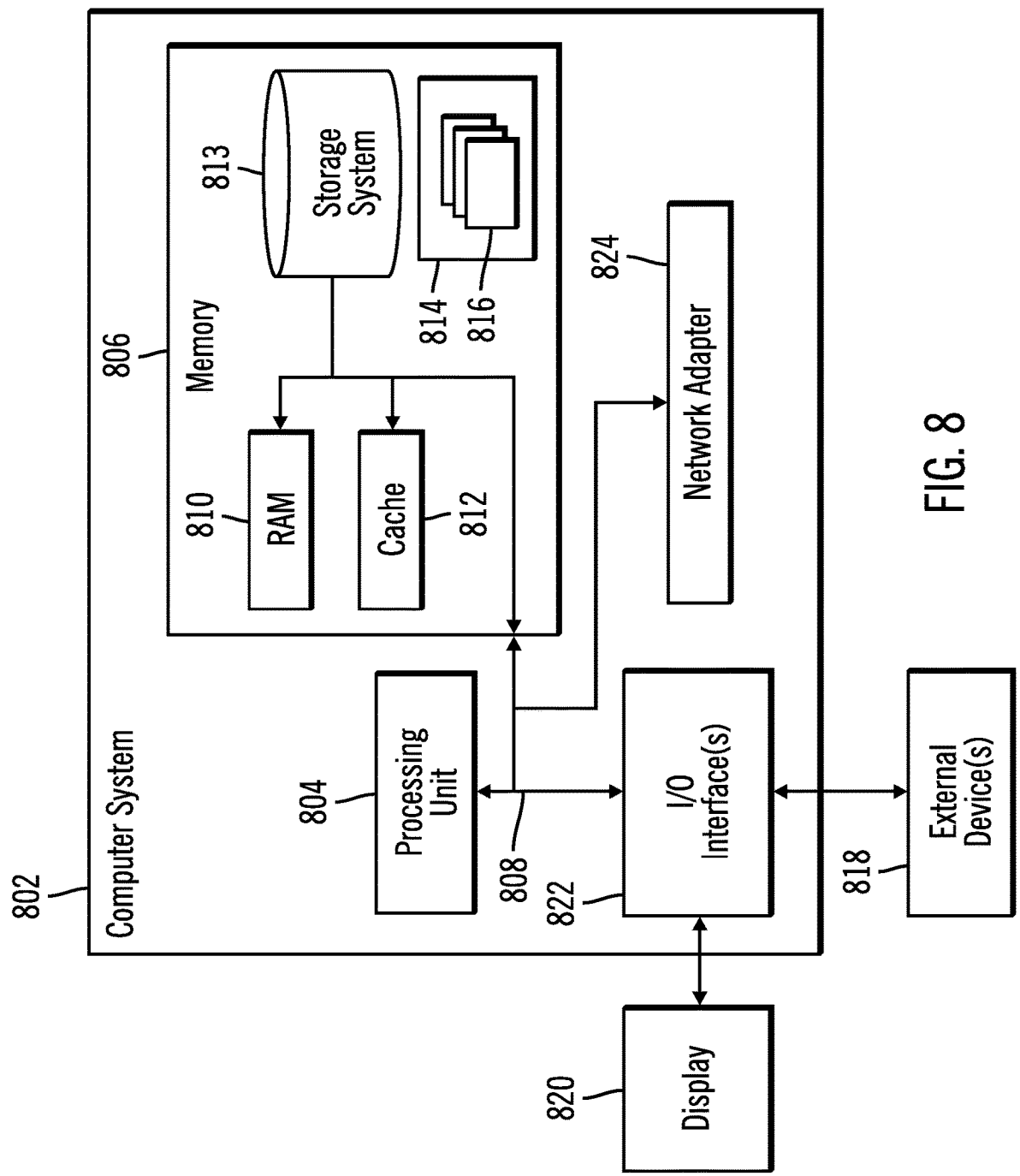
FIG. 8 illustrates a computing environment in which the components of FIG. 1 may be implemented.

The computational components of FIGS. 1 and 2, including the storage controller 100, host 108, and processing nodes $200_1$, $200_2$, $200_i$ may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining tracks to prestage into cache from a storage, wherein the computer program product comprises a non-transitory computer readable storage medium having computer readable program code embodied therein that when executed performs operations, the operations comprising: providing input information related to determining sequentially accessed tracks to prestage from the storage to the cache and Input/Output (I/O) activity information to a machine learning module; receiving, from the machine learning module having processed the provided information, a trigger track at which to start prestaging a prestage amount of sequentially accessed tracks in response to an access request to the trigger track; calculating a margin of error based on information related to a sequentially accessed track in the cache; adjusting at least one of the trigger track and the prestage amount by the calculated margin of error to produce at least one of an adjusted trigger track and an adjusted prestage amount; retraining the machine learning module with the input information related to determining sequentially accessed tracks to prestage to produce at least one of the adjusted trigger track and the adjusted prestage amount; and using the retrained machine learning module to produce at least one of a new trigger track and a new prestage amount to use to determine sequentially accessed tracks to prestage.

2. The computer program product of claim 1, wherein the calculating the margin of error comprises:
calculating a time margin of error based on a difference of a current time and a time when the sequentially accessed track was prestaged, wherein the adjusting the at least one of the trigger track and the prestage amount comprises adjusting the at least one of the trigger track and the prestage amount by the time margin of error.

3. The computer program product of claim 2, wherein the calculating the time margin of error comprises dividing the difference of the current time and the time when the sequentially accessed track was prestaged by an average time tracks are in cache.

4. The computer program product of claim 2, wherein the operations comprise:
demoting a sequentially accessed track from the cache, wherein the sequentially accessed track for which the time margin of error is calculated comprises the demoted sequentially accessed track, wherein the time margin of error is calculated in response to demoting the sequentially accessed track.

5. The computer program product of claim 4, wherein the operations further comprises:
determining whether the demoted sequentially accessed track was accessed while in the cache, wherein the adjusting the at least one of the trigger track and the prestage amount comprises:
performing at least one of decreasing the trigger track and increasing the prestage amount by a percentage based on the time margin of error in response to determining that the demoted sequentially accessed track was accessed while in the cache; and
performing at least one of increasing the trigger track and decreasing the prestage amount by a percentage based on the time margin of error in response to determining that the demoted sequentially accessed track was not accessed while in the cache.

6. The computer program product of claim 1, wherein the calculating the margin of error comprises:
calculating a track position margin of error based on a difference of the trigger track and a number of the sequentially accessed track, wherein the adjusting the at least one of the trigger track and the prestage amount comprises decreasing the trigger track by the track position margin of error.

7. The computer program product of claim 6, wherein the operations further comprise:
detecting a cache miss to a sequentially accessed track in the cache, wherein the sequentially accessed track for which the track position margin of error is calculated comprises the sequentially accessed track for which the cache miss was detected, wherein the track position margin in of error is calculated in response to detecting the cache miss.

8. The computer program product of claim 6, wherein the adjusting the at least one of the trigger track and the prestage amount comprises:
performing at least one of decreasing the trigger track and increasing the prestage amount by the track position margin of error.

9. A system for determining tracks to prestage into cache from a storage, comprising:
a processor; and
a computer readable storage medium having computer readable program code embodied therein that when executed by the processor performs operations, the operations comprising:
providing input information related to determining sequentially accessed tracks to prestage from the storage to the cache and Input/Output (I/O) activity information to a machine learning module;
receiving, from the machine learning module having processed the provided information, a trigger track at which to start prestaging a prestage amount of sequentially accessed tracks in response to an access request to the trigger track;
calculating a margin of error based on information related to a sequentially accessed track in the cache;
adjusting at least one of the trigger track and the prestage amount by the calculated margin of error to produce at least one of an adjusted trigger track and an adjusted prestage amount;
retraining the machine learning module with the input information related to determining sequentially accessed tracks to prestage to produce at least one of the adjusted trigger track and the adjusted prestage amount; and
using the retrained machine learning module to produce at least one of a new trigger track and a new prestage amount to use to determine sequentially accessed tracks to prestage.

10. The system of claim 9, wherein the calculating the margin of error comprises:
calculating a time margin of error based on a difference of a current time and a time when the sequentially accessed track was prestaged, wherein the adjusting the at least one of the trigger track and the prestage amount comprises adjusting the at least one of the trigger track and the prestage amount by the time margin of error.

11. The system of claim 10, wherein the calculating the time margin of error comprises dividing the difference of the current time and the time when the sequentially accessed track was prestaged by an average time tracks are in cache.

12. The system of claim 10, wherein the operations comprise:
   demoting a sequentially accessed track from the cache, wherein the sequentially accessed track for which the time margin of error is calculated comprises the demoted sequentially accessed track, wherein the time margin of error is calculated in response to demoting the sequentially accessed track.

13. The system of claim 12, wherein the operations further comprises:
   determining whether the demoted sequentially accessed track was accessed while in the cache, wherein the adjusting the at least one of the trigger track and the prestage amount comprises:
      performing at least one of decreasing the trigger track and increasing the prestage amount by a percentage based on the time margin of error in response to determining that the demoted sequentially accessed track was accessed while in the cache; and
      performing at least one of increasing the trigger track and decreasing the prestage amount by a percentage based on the time margin of error in response to determining that the demoted sequentially accessed track was not accessed while in the cache.

14. The system of claim 9, wherein the calculating the margin of error comprises:
   calculating a track position margin of error based on a difference of the trigger track and a number of the sequentially accessed track, wherein the adjusting the at least one of the trigger track and the prestage amount comprises decreasing the trigger track by the track position margin of error.

15. The system of claim 14, wherein the operations further comprise:
   detecting a cache miss to a sequentially accessed track in the cache, wherein the sequentially accessed track for which the track position margin of error is calculated comprises the sequentially accessed track for which the cache miss was detected, wherein the track position margin in of error is calculated in response to detecting the cache miss.

16. The system of claim 14, wherein the adjusting the at least one of the trigger track and the prestage amount comprises:
   performing at least one of decreasing the trigger track and increasing the prestage amount by the track position margin of error.

17. A method for determining tracks to prestage into cache from a storage, comprising:
   providing input information related to determining sequentially accessed tracks to prestage from the storage to the cache and Input/Output (I/O) activity information to a machine learning module;
   receiving, from the machine learning module having processed the provided information, a trigger track at which to start prestaging a prestage amount of sequentially accessed tracks in response to an access request to the trigger track;
   calculating a margin of error based on information related to a sequentially accessed track in the cache;
   adjusting at least one of the trigger track and the prestage amount by the calculated margin of error to produce at least one of an adjusted trigger track and an adjusted prestage amount;
   retraining the machine learning module with the input information related to determining sequentially accessed tracks to prestage to produce at least one of the adjusted trigger track and the adjusted prestage amount; and
   using the retrained machine learning module to produce at least one of a new trigger track and a new prestage amount to use to determine sequentially accessed tracks to prestage.

18. The method of claim 17, wherein the calculating the margin of error comprises:
   calculating a time margin of error based on a difference of a current time and a time when the sequentially accessed track was prestaged, wherein the adjusting the at least one of the trigger track and the prestage amount comprises adjusting the at least one of the trigger track and the prestage amount by the time margin of error.

19. The method of claim 18, wherein the calculating the time margin of error comprises dividing the difference of the current time and the time when the sequentially accessed track was prestaged by an average time tracks are in cache.

20. The method of claim 18, further comprising:
   demoting a sequentially accessed track from the cache, wherein the sequentially accessed track for which the time margin of error is calculated comprises the demoted sequentially accessed track, wherein the time margin of error is calculated in response to demoting the sequentially accessed track.

* * * * *